US011675944B2

(12) United States Patent
Arie et al.

(10) Patent No.: US 11,675,944 B2
(45) Date of Patent: Jun. 13, 2023

(54) POWER REDUCTION IN VERY LARGE-SCALE INTEGRATION (VLSI) SYSTEMS

(71) Applicant: International Business Machines Corporation, Armonk, NY (US)

(72) Inventors: Lior Arie, Rishon Lezion (IL); Derrick Merrill Smith, Austin, TX (US); Israel A. Wagner, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 17/321,708

(22) Filed: May 17, 2021

(65) Prior Publication Data

US 2022/0366110 A1 Nov. 17, 2022

(51) Int. Cl.
*G06F 30/30* (2020.01)
*G06F 30/327* (2020.01)
*G06F 30/398* (2020.01)
*G06F 30/337* (2020.01)
*G01R 31/26* (2020.01)

(52) U.S. Cl.
CPC ....... *G06F 30/327* (2020.01); *G01R 31/2639* (2013.01); *G06F 30/337* (2020.01); *G06F 30/398* (2020.01)

(58) Field of Classification Search
CPC .... G06F 30/327; G06F 30/337; G06F 30/398; G06F 30/367; G06F 2119/06; G01R 31/2639
See application file for complete search history.

(56) References Cited

U.S. PATENT DOCUMENTS

| 6,209,122 | B1 | 3/2001 | Jyu |
| 6,397,170 | B1 | 5/2002 | Dean |
| 6,754,877 | B1* | 6/2004 | Srinivasan .............. G06F 30/39 716/134 |
| 7,539,243 | B1* | 5/2009 | Toifl .................. H04L 25/03057 327/554 |
| 10,699,051 | B1 | 6/2020 | Zhang |
| 2013/0174115 | A1 | 7/2013 | Tang |
| 2016/0292317 | A1 | 10/2016 | Subramaniam |
| 2017/0040461 | A1 | 2/2017 | Tarakji |

\* cited by examiner

*Primary Examiner* — Jack Chiang
*Assistant Examiner* — Brandon Bowers
(74) *Attorney, Agent, or Firm* — Edward J. Wixted, III

(57) ABSTRACT

In an approach utilizing static analysis, a processor receives a netlist for an integrated circuit. For at least one node of the integrated circuit in the netlist, a processor calculates (i) a total capacitive load of the respective node and (ii) a minimum required driver size. For a driver of the respective node, a processor (i) determines an effective driver size of the driver based on at least a number of fins of the driver and (ii) determines that the effective driver size exceeds the minimum required driver size multiplied by a predefined sizing margin. A processor, responsive to determining that the effective driver size exceeds the minimum required driver size multiplied by the predefined sizing margin, generates a report, where the report includes at least the driver and a suggestion to reduce the effective size of the driver.

20 Claims, 4 Drawing Sheets

POWER REDUCTION IN VERY LARGE-SCALE INTEGRATION (VLSI) SYSTEMS

BACKGROUND

The present invention relates generally to the field of very large-scale integration (VLSI) design, and more particularly to reducing power consumption of VLSI systems by using a rule-based algorithm to detect and correct overpowered devices within a VLSI design.

VLSI is the process of creating an integrated circuit (IC) by combining many metal-oxide-semiconductor field-effect transistors (MOSFETs) onto a single chip. Before the introduction of VLSI technology, most ICs had a limited set of functions. For example, an electronic circuit might have consisted of a central processing unit (CPU), read-only memory (ROM), or random-access memory (RAM). VLSI allows IC designers to add multiple functions to a single chip.

SUMMARY

According to one embodiment of the present invention, a computer-implemented method, computer program product, and computer system are provided. A processor receives a netlist for an integrated circuit. For at least one node of the integrated circuit in the netlist, a processor calculates (i) a total capacitive load of the respective node and (ii) a minimum required driver size, the minimum required driver size based on the total capacitive load of the node and a selected gain. For the driver of the respective node, a processor (i) determines an effective driver size of the driver based on at least a number of fins of the driver and (ii) determines whether the effective driver size exceeds the minimum required driver size multiplied by a predefined sizing margin. A processor, responsive to determining that the effective driver size exceeds the minimum required driver size multiplied by the predefined sizing margin, generates a report, where the report includes at least the driver and a suggestion to reduce the effective size of the driver.

DETAILED DESCRIPTION

A variety of power saving methodologies are used in servers and other computing devices to try to reduce the power consumption necessary to run the system. Embodiments of the present invention recognize that custom array designs and other custom large blocks allow for power saving if device sizes are tuned to reduce dynamic power and leakage power. Embodiments of the present invention recognize that manual searching for overpowered devices in very large-scale integration (VLSI) designs is time consuming and has a high level of complexity that makes such a process incredibly difficult. For example, due to design complexity, it may not be possible to manually cover all of the circuits and verify that all of the transistors are sized properly for timing and minimum power consumption. Embodiments of the present invention further recognize that device types of a VLSI design may not be able to be changed, but a designer may have the flexibility to change the size of such devices when the respective device is overpowered (e.g., has more fins than are necessary to achieve the desired gain at a particular node). Embodiments of the present invention describe an approach utilizing a rules-based algorithm to detect and correct oversized devices in a VLSI design. The approach described by embodiments of the present invention is based on static analysis and, as dynamic simulations are not required, is much faster than known solutions in the art.

Embodiments of the present invention will now be described in detail with reference to the Figures.

Figure 1:
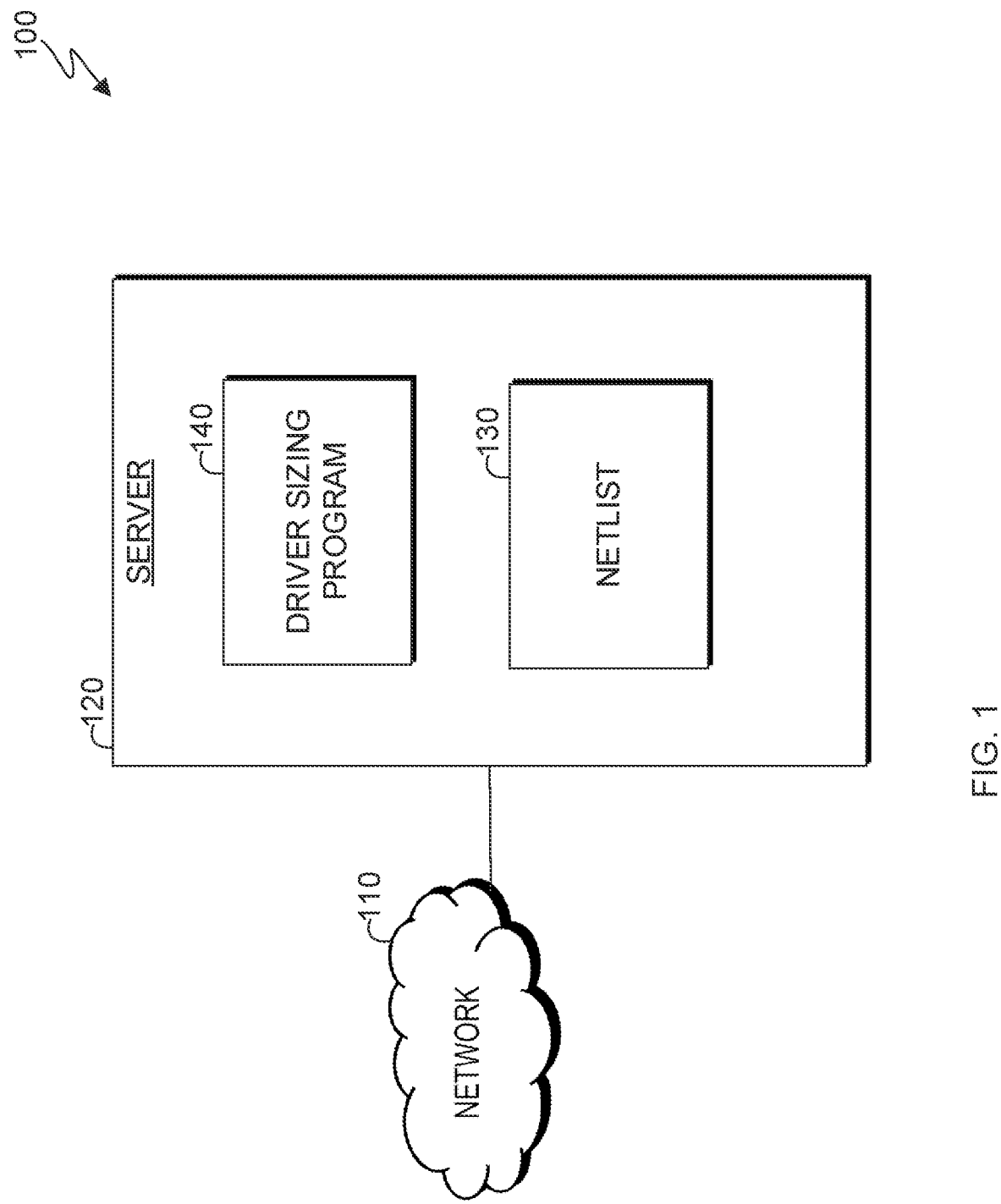
FIG. 1 is a functional block diagram illustrating a computer environment, in accordance with an embodiment of the present invention.

FIG. 1 is a functional block diagram illustrating a computing environment, generally designated 100, in accordance with one embodiment of the present invention. FIG. 1 provides only an illustration of one embodiment and does not imply any limitations with regards to the environments in which different embodiments may be implemented.

In the depicted embodiment, computing environment 100 includes server 120 connected to network 110. Network 110 may be a local area network (LAN), a wide area network (WAN), such as the Internet, the public switched telephone network (PSTN), any combination thereof, or any combination of connections and protocols that will support communications between server 120 and other computing device(s) (not shown), in accordance with embodiments of the present invention. Computing environment 100 may include additional servers, computing devices, or other devices not shown.

Server 120 may be a management server, a web server, or any other electronic device or computing system capable of sending and receiving data. In some embodiments, server 120 may be a laptop computer, tablet computer, personal computer (PC), a desktop computer, a smartphone, or any programmable electronic device. In some embodiments, server 120 may represent a server computing system utilizing multiple computers as a server system, such as in a cloud computing environment. Server 120 includes netlist 130 and driver sizing program 140. Server 120 may include components, as depicted and described in further detail with respect to FIG. 4.

Netlist 130 is a netlist for a design of a VLSI system. A netlist is a description of the connectivity of an electronic circuit. A netlist includes electronic components in a circuit and nodes that the electronic components are connected to. A network is a collection of two or more interconnected components. Netlist 130 is the netlist for the VLSI system that is under analysis by driver sizing program 140. Netlist 130 may be stored to a repository of server 120. In some embodiments, netlist 130 may be received from a computing device accessible via network 110. Netlist 130 may be a schematic netlist or an extracted netlist.

Driver sizing program 140 operates to analyze netlists, such as netlist 130, and determine drivers which are oversized and provide recommendations as to the proper size of such devices. Drivers include, for example, complementary metal-oxide-semiconductor (CMOS) gates (inverter, NAND, NOR), dynamic circuits, latches, local clock buffers (LCBs), or other devices described in netlist 130. In some embodiments, driver sizing program 140 is a function of a VLSI design program. In one embodiment, driver sizing program 140 resides on server 120. In other embodiments, driver sizing program 140 may reside on another server or another computing device, provided that driver sizing program 140 has access to netlist 130.

Figure 2:
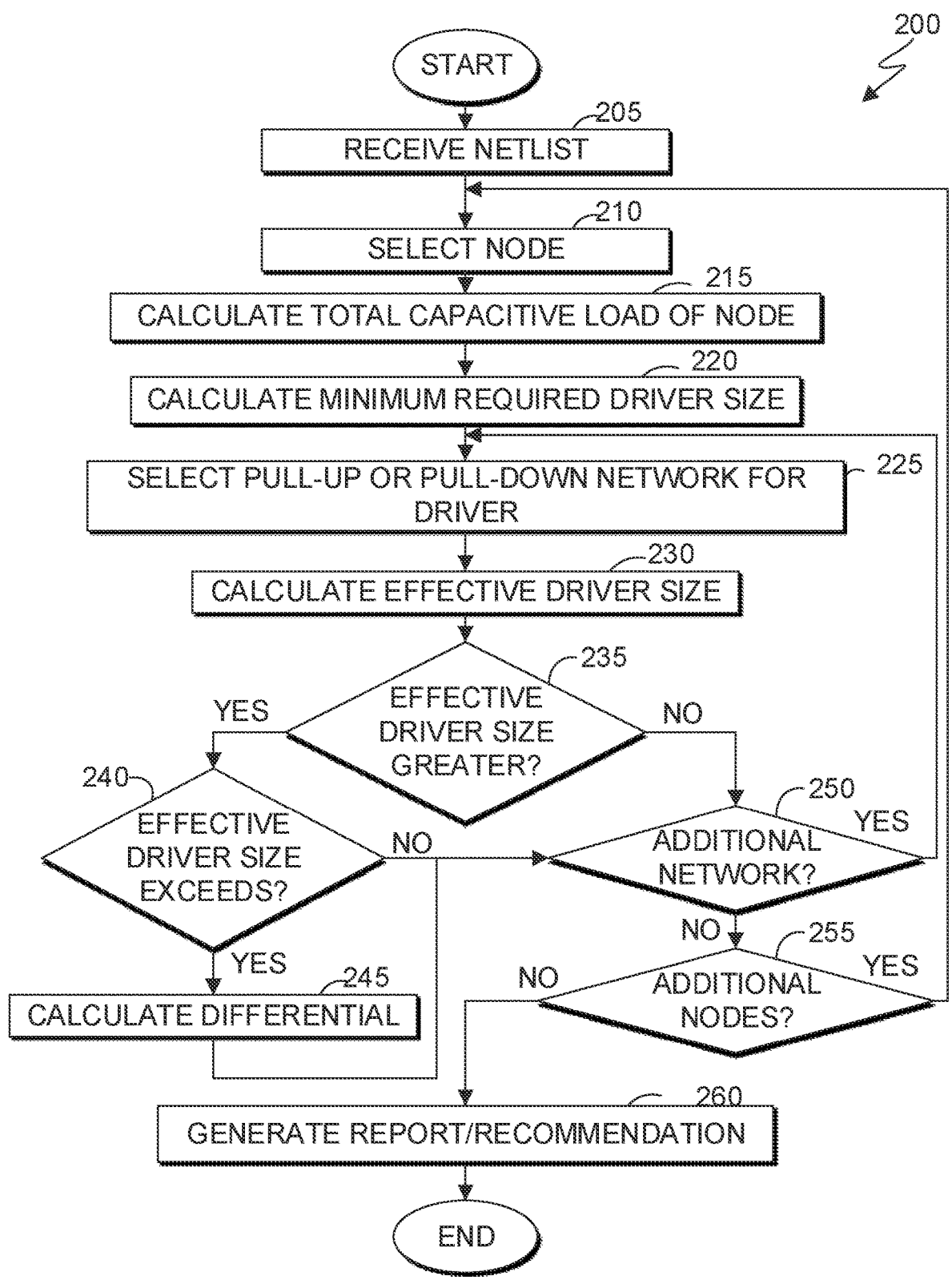
FIG. 2 is a flowchart depicting operational steps of a driver sizing program, executing within the computer environment of FIG. 1, for identifying drivers from a netlist that are oversized, in accordance with an embodiment of the present invention.

FIG. 2 depicts a flowchart 200 for the steps of driver sizing program 140, executing within computing environment 100 of FIG. 1, for determining oversized drivers that exist on a netlist, such as netlist 130, for a VLSI integrated circuit design and providing recommendations as to proper sizes for such devices that may reduce power consumption while still maintaining required gains.

In one embodiment, initially, a user creates a VLSI design that includes any number of drivers such as CMOS gates (e.g., inverter, NAND, NOR), dynamic circuits, latches, LCBs, or other devices. In general, the VLSI design may be constrained such that all of the drivers are required, but there is flexibility as to the size (e.g., number of fins) of the drivers, so long as the necessary gain is maintained at each node of the device.

A user may further specify a number of constraints or constants that are to be used by driver sizing program 140 in performing the analysis of the VLSI design. More particularly, a user may specify a minimum FET size indicating a minimum number of fins in any FET type drivers (e.g., pFET, nFET). For example, a user may specify a minimum FET size of two, indicating that each FET type driver must have at least two fins. A user may specify a gain (e.g., gain=three for critical nets, gain=ten for direct current (DC) nets). The gain may be selected based on the requirements for the design. In general, with higher gain, the circuit is faster and has lower power consumption but the circuit also becomes more sensitive to noise and is therefore less robust. A user may also specify a sizing margin N, which is a designation indicating that a particular driver may be N times larger than the minimum required size for driving the node with a desired gain. Essentially, N acts as a factor to define a threshold, above which, driver sizing program 140 generates an error report and recommendation to reduce driver size.

In general, driver sizing program 140 ignores nFET/pFETs with effective sizes of two fins or less, minimum sized LCBs and latches, internal nets in LCBs and latches, and internal nets in standard gates (e.g., XOR, XNOR, AND-OR-Invert (AOI), and OR-AND-Invert (OAI)).

In step 205, driver sizing program 140 receives a netlist (described herein as netlist 130). A netlist is a description of the connectivity of an electronic circuit. In its simplest form, a netlist consists of a list of the electronic components in a circuit and a list of the nodes they are connected to. A network is a collection of two or more interconnected components. Most netlists either contain or refer to descriptions of the parts of devices used. As used in embodiments of the present invention, the netlist received by driver sizing program 140 may be a schematic (electrical) or extracted netlist (layout). In general, regarding the extracted netlist, netlist extraction may be used to translate an integrated circuit layout into the electrical circuit netlist that it is intended to represent. Netlist 130 includes information such as capacitive load, driver sizes (e.g., number of fins), and descriptions of each driver.

In step 210, driver sizing program 140 selects a node for analysis. In general, a node is any region between two circuit elements. Nodes may also be referred to as nets and are the "wires" that connect devices such as drivers together in the circuit. In general, driver sizing program 140 iteratively selects nodes for analysis according to the steps of flowchart 200 until all nodes of netlist 130 have been analyzed. In some embodiments, driver sizing program 140 selects nodes based on distance from an output pin. In other words, driver sizing program 140 may determine the number of gates along the shortest path to an output pin for each node and, for each node determine that the number of gates along the shortest path is the distance from output. In such embodiments, driver sizing program 140 may then select nodes in an ascending order based on distance from output (i.e., driver sizing program 140 selects nodes by starting from the outputs and iteratively working to the inputs).

In step 215, driver sizing program 140 calculates total capacitive load for the selected node. Capacitive loads include energy stored in materials and devices, such as capacitors, and cause changes in voltage to lag behind changes in current. Driver sizing program 140 calculates the total capacitive load for the selected load by adding the capacitive load of any wires to the capacitive load of any gates present along the node. In general, a gate's capacitive load is proportional to its area. Capacitive load of the wires, gates, and other drivers may be specified in netlist 130 and such capacitive loads may have been calculated by a netlist tool.

In step 220, driver sizing program 140 calculates the minimum required driver size for the driver of the selected node. Driver sizing program 140 calculates the minimum required driver size for the driver of the selected node by dividing one half of the total capacitive load for the selected node by the selected gain. The minimum required driver size corresponds to the minimum number of fins required for achieving the desired gain at the selected node.

In step 225, driver sizing program 140 selects one of the pull-up network and the pull-down network of the driver for analysis. In general, driver sizing program 140 iteratively selects between the pull-up network and the pull-down network of the driver of the selected node for analysis until each network of the driver has been analyzed. A pull-up network is a network that provides a low resistance path the drain when output is logic '1' and provides a high resistance to the drain otherwise. A pull-down network is a network that provides a low resistance path to ground when output is logic '0' and provides a high resistance to ground otherwise.

In step 230, driver sizing program 140 calculates the effective driver size for the driver based on the selected network (i.e., pull-up/pull-down). The particular means by which driver sizing program 140 calculates the effective driver size for the selected driver is discussed in further detail with respect to FIG. 3. The effective driver size is a number of fins for the driver and varies based on whether the FET(s) that comprise the driver are arranged in series or in parallel.

In decision 235, driver sizing program 140 determines whether the effective driver size is greater than the minimum FET size. As previously described, a user may define the minimum FET size based on design requirements for the VLSI integrated circuit design. Accordingly, driver sizing program 140 compares the effective driver size of the selected driver to the minimum FET size.

If driver sizing program 140 determines that the effective driver size is not greater than the minimum FET size (decision 235, no branch), driver sizing program 140 determines whether an additional network for the driver is present in the selected node (i.e., driver sizing program 140 determines whether both or only a single instance of the pull-up network and the pull-down network have been analyzed) (decision 250).

If driver sizing program 140 determines that the effective driver size is greater than the minimum FET size (decision 235, yes branch), driver sizing program 140 determines whether the effective driver exceeds the sizing margin multiplied by the minimum required driver size (decision 240). As previously described, driver sizing program 140 calculates the minimum required driver size (see step 220). As also previously described, the sizing margin is selected and input by a user.

If driver sizing program 140 determines that the effective driver size exceeds the sizing margin multiplied by the minimum required driver size (decision 240, yes branch), driver sizing program 140 calculates a differential between the effective driver size and the minimum required driver size (step 245). As previously described, driver sizing program 140 calculates the minimum required driver size at step 220. In general, driver sizing program 140 calculates the differential by subtracting the minimum required driver size from the effective driver size of the selected driver.

If driver sizing program 140 determines that the effective driver size does not exceed the sizing margin multiplied by the minimum required driver size (decision 240, no branch), driver sizing program 140 determines whether an additional network for the driver is present in the selected node (decision 250). In general, driver sizing program 140 analyzes each driver of the selected node according to the process described by steps 225-245 and determines whether there are additional drivers to be analyzed by accessing netlist 130.

If driver sizing program 140 determines that there is an additional network for the driver in the selected node (decision 250, yes branch), driver sizing program 140 selects the other network (i.e., the other of the pull-up or pull-down network for the driver) (see step 225).

If driver sizing program 140 determines that there are no additional networks in the selected node (e.g., both the pull-up and pull-down networks have been analyzed) (decision 250, no branch), driver sizing program 140 determines whether there are additional nodes (decision 255). Driver sizing program 140 accesses netlist 130 and determines if there are additional nodes that have not yet been analyzed according to the process described in steps 210-250.

If driver sizing program 140 determines that there are additional nodes in netlist 130 (decision 255, yes branch), driver sizing program 140 selects another node (see step 210).

If driver sizing program 140 determines that there are no additional nodes in netlist 130 (decision 255, no branch), driver sizing program 140 generates a report and/or recommendation (step 260). In general, the report identifies particular drivers of the VLSI design from the netlist that could have a reduced fin count while maintaining the necessary gain. The report may specify items such as the name of the driver, effective driver size, minimum required driver size, desired gain, and the differential between the effective driver size and the minimum required driver size. In general, the differential is a suggested amount by which the effective driver size can be reduced while still achieving the desired gain. The report may include this information for each driver on each node analyzed by driver sizing program 140. In one embodiment, each entry of the report may be in sentence format, such as "Error: Effective size of <driver name> is <effective driver size> fins while <minimum required driver size> fins are required for achieving gain=<gain>. Suggested reduction of effective size by <differential> fins." In such an embodiment, driver sizing program 140 populates each <item> based on the entered, calculated, or otherwise determined values. Throughout the process, driver sizing program 140 may store each value to persistent storage of server 120. In addition, each of the values (e.g., gain, sizing margin, minimum FET size, capacitive load values, minimum required driver size, effective driver size, driver name, node information, differential,) may be stored to the report generated by driver sizing program 140. In some embodiments, if driver sizing program 140 does not identify any driver resizing recommendations, a report may not be generated. Alternatively, in such instances, driver sizing program 140 may generate a report indicating that all of the drivers of the VLSI design are optimally sized.

Using the report generated by driver sizing program 140, a user may be able to adjust the design of the VLSI integrated circuit to incorporate the suggested driver size adjustments and increase the energy efficiency of the device.

In some embodiments, rather than generating a report, driver sizing program 140 may be able to automatically adjust the sizes of the drivers based on the information obtained by driver sizing program and update the netlist accordingly. In such an embodiment, each time driver sizing program 140 determines that the effective driver size of a driver is greater than the minimum FET size, driver sizing program 140 may change the effective driver size of the driver to the minimum driver size. Such driver size changes may be stored to the netlist such that the actual size of the drivers can be adjusted. As described above, driver sizing program 140 may iteratively adjust each driver size, as necessary, according to ascending distance from an output pin of each of the respective nodes.

Figure 3:
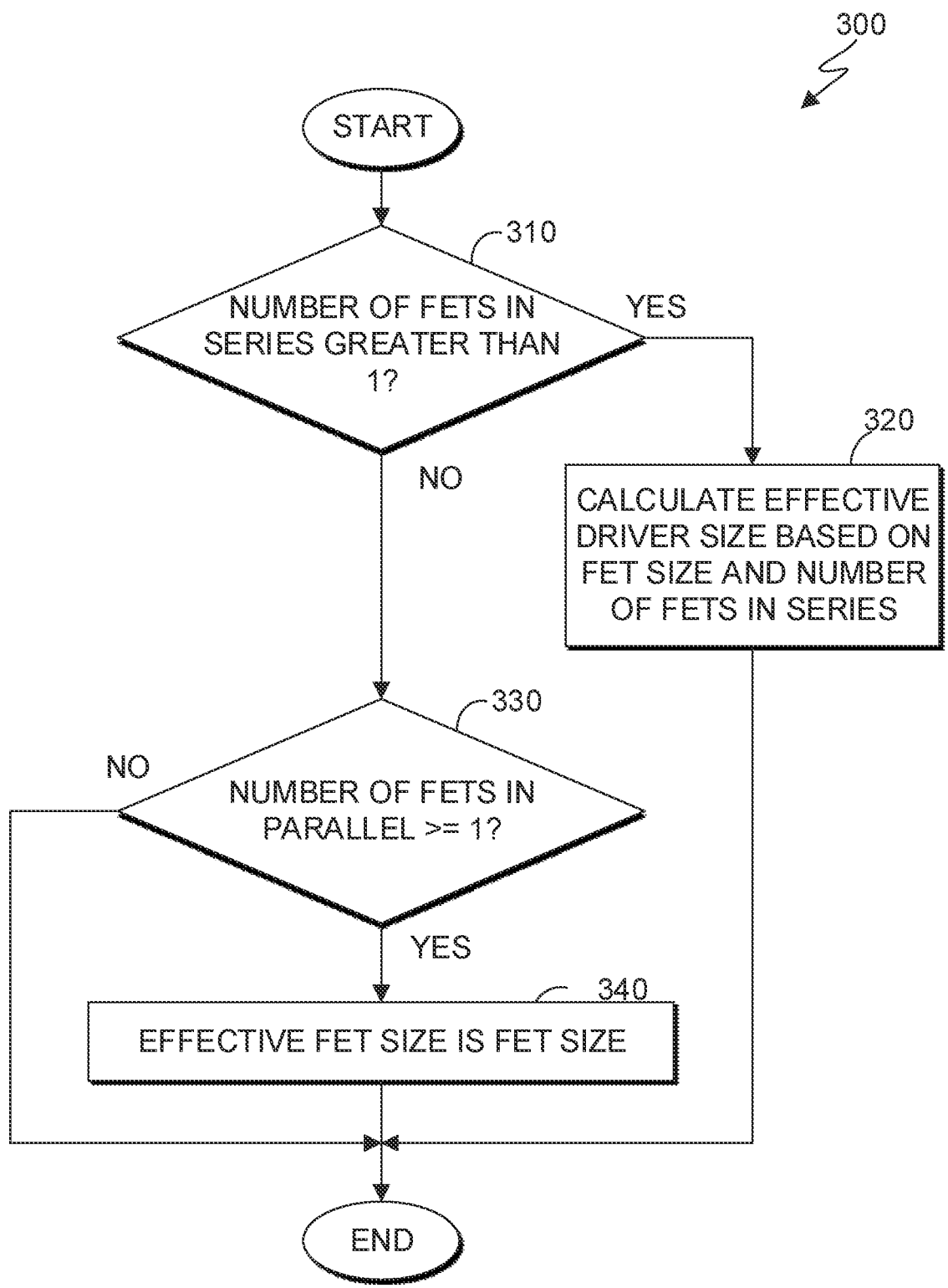
FIG. 3 is a flowchart depicting further operational steps of the driver sizing program, in accordance with an embodiment of the present invention.

FIG. 3 depicts a flowchart 300 for the steps of a driver sizing program 140 executing within computing environment 100 of FIG. 1. More particularly, FIG. 3 depicts details of how an effective driver size is calculated for a particular driver.

In decision 310, driver sizing program 140 determines whether the number of FET(s) that are connected in series is greater than one. Driver sizing program 140 determines the number of FET(s) that are connected in series by analyzing netlist 130.

If driver sizing program 140 determines that more than one of the FETS that comprise the driver are in series (decision 310, yes branch), in step 320, driver sizing program 140 calculates the effective driver size based on the FET size (i.e., number of fins of each FET that comprise the driver) and number of FETS that are in series. More particularly, driver sizing program 140 may calculate the effective driver size as the FET size divided by the number of FETs that are in series.

If driver sizing program 140 determines that one or fewer FETs of the driver are in series (decision 310, no branch), driver sizing program 140 determines whether the number of FETs of the driver that are in parallel is greater than or equal to one (decision 330). Similar to decision 310, driver sizing program 140 determines the number of FETs of the driver that are in parallel by extracting and analyzing data from netlist 130.

If driver sizing program 140 determines that the number of FETs in parallel is less than one (decision 330, no branch), step 230 (see FIG. 2) is complete and driver sizing program 140 determines whether the effective driver size is greater than the minimum FET size (see decision 235, FIG. 2).

In step 340, if driver sizing program 140 determines that the number of FETs in parallel is greater than or equal to one (decision 330, yes branch), driver sizing program 140 determines that the effective driver size is equal to the FET size.

Figure 4:
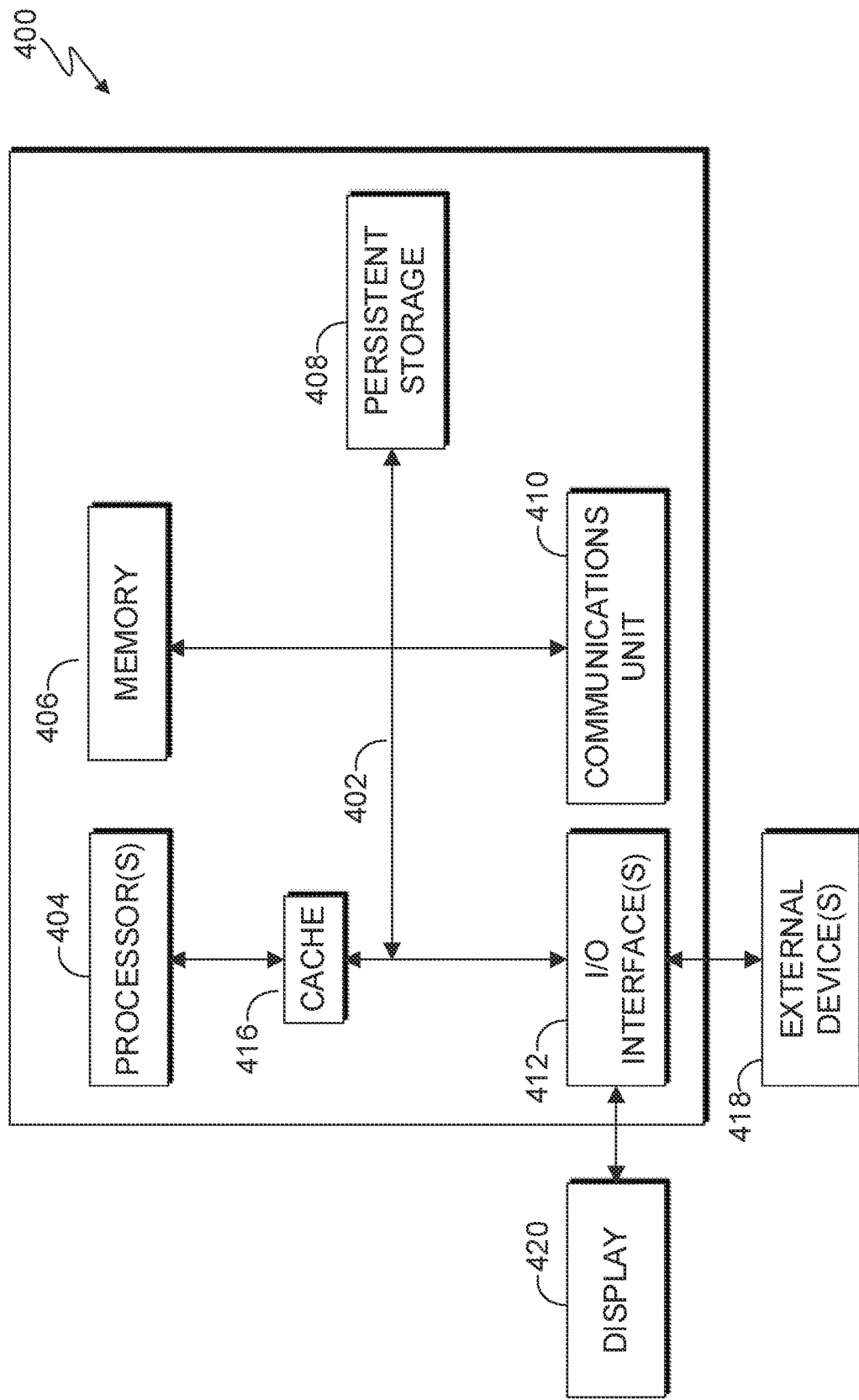
FIG. 4 is a block diagram of components of the server of FIG. 1 in accordance with an embodiment of the present invention.

FIG. 4 depicts a block diagram 400 of components of server 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 120 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Netlist 130 and driver sizing program 140 may be stored in persistent storage 408 and in memory 406 for execution and/or access by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Netlist 130 and driver sizing program 140 may be downloaded to persistent storage 408 through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., netlist 130 and driver sizing program 140, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    receiving, by one or more processors, a netlist for an integrated circuit;
    for at least one node of the integrated circuit in the netlist:
        calculating, by one or more processors, a total capacitive load of the respective node;
        calculating, by one or more processors, a minimum required driver size based on the total capacitive load of the node and a selected gain; and
        for a driver of the respective node:
            determining, by one or more processors, an effective driver size of the driver based on at least a number of fins of the driver; and
            determining, by one or more processors, that the effective driver size exceeds the minimum required driver size multiplied by a predefined sizing margin; and
    responsive to determining that the effective driver size exceeds the minimum required driver size multiplied by the predefined sizing margin, generating, by one or more processors, a report, wherein the report includes at least the driver and a suggestion to reduce the effective size of the driver.

2. The computer-implemented method of claim 1, further comprising:
    responsive to determining that the effective driver size exceeds the minimum required driver size multiplied by the predefined sizing margin, adjusting the driver from the effective driver size to the minimum required driver size on the netlist.

3. The computer-implemented method of claim 1, further comprising:
    determining, by one or more processors, that the effective driver size exceeds a predefined minimum number of fins;
    responsive to determining that the effective driver size exceeds the predefined minimum number of fins, determining a difference between the effective driver size and the minimum required driver size; and
    wherein the report further comprises a recommendation to reduce a number of fins of the driver by the determined difference.

4. The computer-implemented method of claim 1, wherein determining the effective driver size comprises:
    determining, by one or more processors, that a number of field-effect transistors (FETs) in series exceeds one; and
    responsive to determining that the number of FETs in series exceeds one, determining, by one or more processors, the effective driver size by dividing the number of fins of the driver by the number of FETs in series.

5. The computer-implemented method of claim 1, wherein determining the effective driver size comprises:
   determining, by one or more processors, that a number of field-effect transistors (FETs) in parallel is at least one; and
   responsive to determining that the number of FETs in parallel is at least one, determining, by one or more processors, the effective driver size to be the number of fins of the driver.

6. The computer-implemented method of claim 1, wherein the integrated circuit is a very large-scale integration (VLSI) integrated circuit.

7. The computer-implemented method of claim 1, wherein the netlist is selected from the group consisting of: a schematic netlist and an extracted netlist.

8. A computer program product comprising:
   one or more computer readable storage media, and program instructions collectively stored on the one or more computer readable storage media, the program instructions comprising:
   program instructions to receive a netlist for an integrated circuit;
   program instructions to, for at least one node of the integrated circuit in the netlist:
     calculate a total capacitive load of the respective node;
     calculate a minimum required driver size based on the total capacitive load of the node and a selected gain; and
     for a driver of the respective node:
       determine an effective driver size of the driver based on at least a number of fins of the driver; and
       determine that the effective driver size exceeds the minimum required driver size multiplied by a predefined sizing margin; and
   program instructions to, responsive to determining that the effective driver size exceeds the minimum required driver size multiplied by the predefined sizing margin, generate a report, wherein the report includes at least the driver and a suggestion to reduce the effective size of the driver.

9. The computer program product of claim 8, further comprising:
   program instructions, collectively stored on the one or more computer readable storage media, to, responsive to determining that the effective driver size exceeds the minimum required driver size multiplied by the predefined sizing margin, adjust the driver from the effective driver size to the minimum required driver size on the netlist.

10. The computer program product of claim 8, further comprising:
    program instructions, collectively stored on the one or more computer readable storage media, to determine that the effective driver size exceeds a predefined minimum number of fins;
    program instructions, collectively stored on the one or more computer readable storage media, to, responsive to determining that the effective driver size exceeds the predefined minimum number of fins, determine a difference between the effective driver size and the minimum required driver size; and
    wherein the report further comprises a recommendation to reduce a number of fins of the driver by the determined difference.

11. The computer program product of claim 8, wherein program instructions to determine the effective driver size comprise:
    program instructions to determine that a number of field-effect transistors (FETs) in series exceeds one; and
    program instructions to, responsive to determining that the number of FETs in series exceeds one, determine the effective driver size by dividing the number of fins of the driver by the number of FETs in series.

12. The computer program product of claim 8, wherein program instructions to determine the effective driver size comprise:
    program instructions to determine that a number of field-effect transistors (FETs) in parallel is at least one; and
    program instructions to, responsive to determining that the number of FETs in parallel is at least one, determine the effective driver size to be the number of fins of the driver.

13. The computer program product of claim 8, wherein the integrated circuit is a very large-scale integration (VLSI) integrated circuit.

14. The computer program product of claim 8, wherein the netlist is selected from the group consisting of: a schematic netlist and an extracted netlist.

15. A computer system comprising:
    one or more computer processors, one or more computer readable storage media, and program instructions collectively stored on the one or more computer readable storage media for execution by at least one of the one or more computer processors, the program instructions comprising:
    program instructions to receive a netlist for an integrated circuit;
    program instructions to, for at least one node of the integrated circuit in the netlist:
      calculate a total capacitive load of the respective node;
      calculate a minimum required driver size based on the total capacitive load of the node and a selected gain; and
      for a driver of the respective node:
        determine an effective driver size of the driver based on at least a number of fins of the driver; and
        determine that the effective driver size exceeds the minimum required driver size multiplied by a predefined sizing margin; and
    program instructions to, responsive to determining that the effective driver size exceeds the minimum required driver size multiplied by the predefined sizing margin, generate a report, wherein the report includes at least the driver and a suggestion to reduce the effective size of the driver.

16. The computer system of claim 15, further comprising:
    program instructions, collectively stored on the one or more computer readable storage media for execution by at least one of the one or more computer processors, to, responsive to determining that the effective driver size exceeds the minimum required driver size multiplied by the predefined sizing margin, adjust the driver from the effective driver size to the minimum required driver size on the netlist.

17. The computer system of claim 15, further comprising:
    program instructions, collectively stored on the one or more computer readable storage media for execution by at least one of the one or more computer processors, to determine that the effective driver size exceeds a predefined minimum number of fins;

program instructions, collectively stored on the one or more computer readable storage media for execution by at least one of the one or more computer processors, to, responsive to determining that the effective driver size exceeds the predefined minimum number of fins, determine a difference between the effective driver size and the minimum required driver size; and wherein the report further comprises a recommendation to reduce a number of fins of the driver by the determined difference.

18. The computer system of claim 15, wherein program instructions to determine the effective driver size comprise:

program instructions to determine that a number of field-effect transistors (FETs) in series exceeds one; and program instructions to, responsive to determining that the number of FETs in series exceeds one, determine the effective driver size by dividing the number of fins of the driver by the number of FETs in series.

19. The computer system of claim 15, wherein program instructions to determine the effective driver size comprise:

program instructions to determine that a number of field-effect transistors (FETs) in parallel is at least one; and program instructions to, responsive to determining that the number of FETs in parallel is at least one, determine the effective driver size to be the number of fins of the driver.

20. The computer system of claim 15, wherein the integrated circuit is a very large-scale integration (VLSI) integrated circuit.

* * * * *